(12) United States Patent
Rauser et al.

(10) Patent No.: US 10,752,447 B1
(45) Date of Patent: Aug. 25, 2020

(54) BIN SWEEP AUGER UNPLUGGING SYSTEM

(71) Applicant: Superior Manufacturing LLC, Kindred, ND (US)

(72) Inventors: Claire M. Rauser, Kindred, ND (US); Jory T. Skalsky, Kindred, ND (US)

(73) Assignee: Superior Manufacturing LLC, Kindred, ND (US)

( * ) Notice: Subject to any disclaimer, the term of this patent is extended or adjusted under 35 U.S.C. 154(b) by 0 days.

(21) Appl. No.: 16/871,552

(22) Filed: May 11, 2020

Related U.S. Application Data

(63) Continuation of application No. 15/959,759, filed on Apr. 23, 2018, now Pat. No. 10,647,517, which is a continuation of application No. 14/973,134, filed on Dec. 17, 2015, now Pat. No. 9,950,872.

(60) Provisional application No. 62/261,304, filed on Nov. 30, 2015.

(51) Int. Cl.
*B65G 33/34* (2006.01)
*B65G 65/46* (2006.01)
*B65D 88/68* (2006.01)

(52) U.S. Cl.
CPC ........... *B65G 33/34* (2013.01); *B65G 65/466* (2013.01); *B65D 88/68* (2013.01)

(58) Field of Classification Search
CPC ........ B65G 33/32; B65G 33/10; B65G 33/34; B65G 33/38; B65G 65/466; B65G 65/46; B65G 69/08; B65D 88/546; B65D 88/68; B65D 88/64; A01F 25/2018; A01D 41/1217

See application file for complete search history.

(56) References Cited

U.S. PATENT DOCUMENTS

| | | | |
|---|---|---|---|
| 2,036,127 A | 3/1936 | Edholm |
| 2,183,274 A | 12/1939 | Barnsdale |
| 2,701,920 A | 2/1955 | Campbell |
| 3,003,667 A | 10/1961 | Jonsson |
| 3,084,814 A | 4/1963 | Schaefer |
| 3,300,873 A | 1/1967 | Bussell |
| 3,327,611 A | 6/1967 | Pedersen |
| 3,449,840 A | 6/1969 | Francis |
| 3,532,232 A | 10/1970 | Sukup |
| 3,557,979 A | 1/1971 | Zortman |

(Continued)

FOREIGN PATENT DOCUMENTS

JP    2012085617 A    5/2012

OTHER PUBLICATIONS

"Overrunning, Indexing, Backstopping Clutches Catalog"; Formsprag Clutch Catalog ; Oct. 12, 2015.

(Continued)

*Primary Examiner* — Glenn F Myers
(74) *Attorney, Agent, or Firm* — Neustel Law Offices

(57) ABSTRACT

A bin sweep auger unplugging system for unplugging a central unloading sump in a storage bin. The bin sweep auger unplugging system generally includes an auger having a driven shaft with auger fighting, a drive unit having a drive shaft, and a clutch connected between the drive shaft and the driven shaft. The clutch selectively transfers the rotation of the drive shaft to the driven shaft of the auger. The drive shaft includes a clump breakup component that breaks up the clump of granular material above the unloading sump when the drive shaft is rotated. The clutch is disengaged when breaking up a clump of granular material to prevent the rotation of the auger.

20 Claims, 13 Drawing Sheets

(56) References Cited

U.S. PATENT DOCUMENTS

| | | | |
|---|---|---|---|
| 3,636,638 | A | 1/1972 | Noyes |
| 3,913,242 | A | 10/1975 | Fackler |
| 3,938,684 | A | 2/1976 | Quoiffy |
| 4,006,536 | A | 2/1977 | Meiners |
| 4,009,520 | A | 3/1977 | Sukup |
| 4,029,219 | A | 6/1977 | Rutten |
| 4,057,151 | A | 11/1977 | Weaver |
| 4,086,708 | A | 5/1978 | Westelaken |
| 4,092,784 | A | 6/1978 | Dietrich |
| 4,103,788 | A | 8/1978 | Sutton |
| 4,118,875 | A | 10/1978 | Sietmann |
| 4,125,945 | A | 11/1978 | Westelaken |
| 4,152,841 | A | 5/1979 | Westelaken |
| 4,237,622 | A | 12/1980 | Francis |
| 4,249,891 | A | 2/1981 | Noyes |
| 4,250,632 | A | 2/1981 | Botkins |
| 4,270,280 | A | 6/1981 | McClaren |
| 4,289,481 | A | 9/1981 | Yano |
| 4,308,669 | A | 1/1982 | Noyes |
| 4,337,584 | A | 7/1982 | Johnson |
| 4,363,264 | A | 12/1982 | Lang |
| 4,371,375 | A | 2/1983 | Dennis, Jr. |
| 4,372,053 | A | 2/1983 | Anderson |
| 4,404,756 | A | 9/1983 | Noyes |
| 4,446,630 | A | 5/1984 | Noyes |
| 4,502,229 | A | 3/1985 | Kitzman |
| 4,583,903 | A | 4/1986 | Hutchison |
| 4,621,968 | A | 11/1986 | Hutchison |
| 4,875,820 | A | 10/1989 | Lepp |
| 4,914,834 | A | 4/1990 | Sime |
| 5,182,871 | A | 2/1993 | Karls |
| 5,233,766 | A | 8/1993 | Frederiksen |
| 5,467,535 | A | 11/1995 | Lentz |
| 5,794,358 | A | 8/1998 | Robertson |
| 5,992,044 | A | 11/1999 | Hanig |
| 6,073,367 | A | 6/2000 | McKenzie |
| 6,076,276 | A | 6/2000 | McKenzie |
| 6,092,300 | A | 7/2000 | Emmel |
| 6,116,898 | A | 9/2000 | Frechette |
| 6,122,838 | A | 9/2000 | Bloemendaal |
| 6,193,053 | B1 | 2/2001 | Gaalswyk |
| 6,209,223 | B1 | 4/2001 | Dinh |
| 6,233,843 | B1 | 5/2001 | McKenzie |
| 6,254,329 | B1 | 7/2001 | Sukup |
| 6,318,000 | B1 | 11/2001 | Satake |
| 6,457,256 | B1 | 10/2002 | Middaugh |
| 6,487,962 | B1 | 12/2002 | Horn |
| 6,834,443 | B2 | 12/2004 | Bloemendaal |
| 6,938,357 | B2 | 9/2005 | Hauch |
| 7,568,297 | B2 | 8/2009 | Pierson |
| 7,578,073 | B2 | 8/2009 | Krell |
| 7,818,894 | B2 | 10/2010 | Noyes |
| 8,124,009 | B2 | 2/2012 | Danchenko |
| 8,356,420 | B2 | 1/2013 | Morrison |
| 8,920,100 | B1 | 12/2014 | Stahl |
| 9,546,055 | B2 | 1/2017 | Hoogestraat |
| 2004/0213650 | A1 | 10/2004 | Epp |
| 2010/0304656 | A1 | 12/2010 | Pacheco Da Cunha |
| 2012/0163947 | A1 | 6/2012 | Koch |

OTHER PUBLICATIONS http://www.grainhandler.com/GrainHandlerBrochure.pdf; Grain Handler Continuous Mix-Flow Dryers Brochure; Sep. 16, 2011.

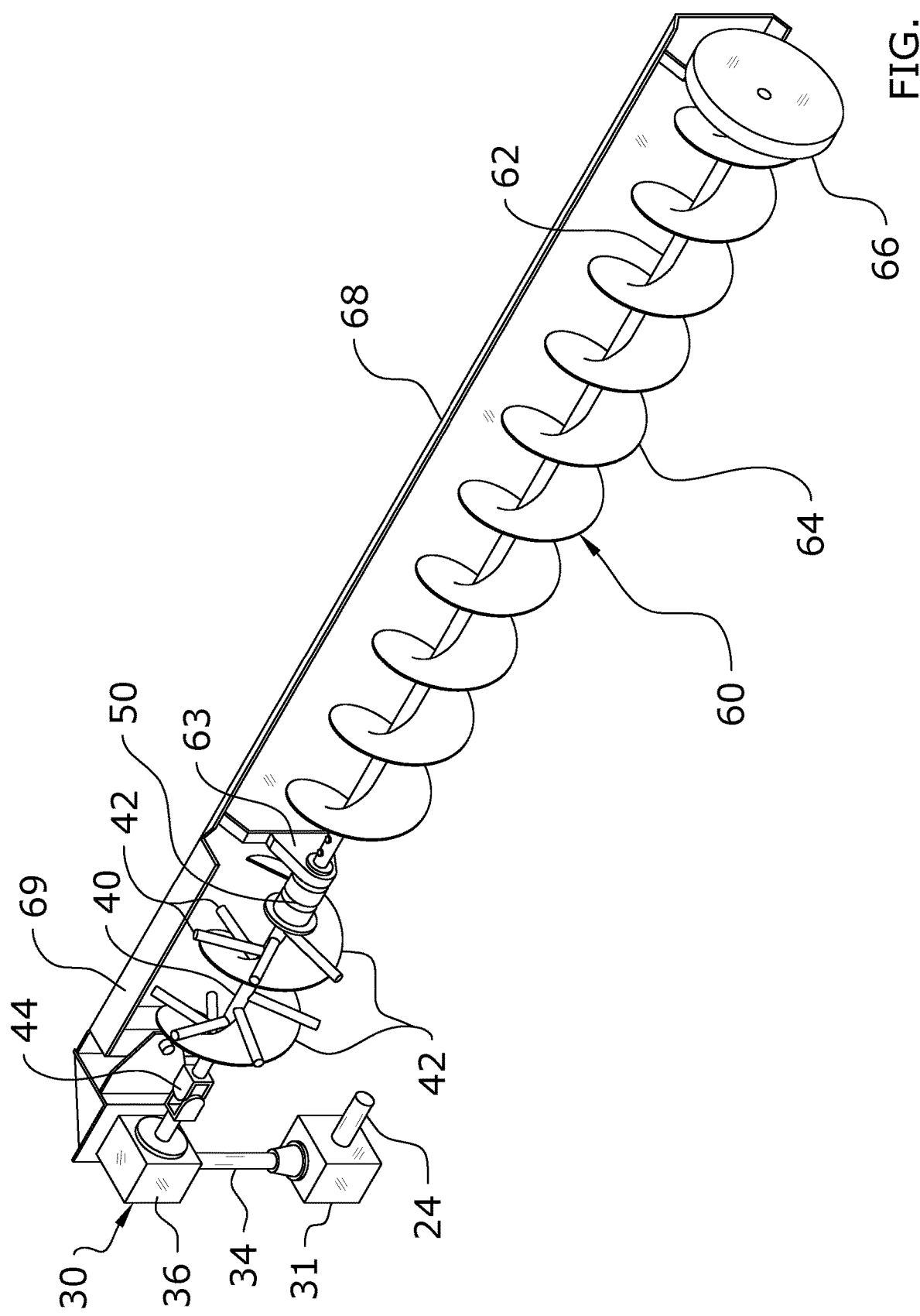

BIN SWEEP AUGER UNPLUGGING SYSTEM

CROSS REFERENCE TO RELATED APPLICATIONS

The present application is a continuation of U.S. application Ser. No. 15/959,759 filed on Apr. 23, 2018 which issues as U.S. Pat. No. 10,647,517 on May 12, 2020, which is a continuation of U.S. application Ser. No. 14/973,134 filed on Dec. 17, 2015 now issued as U.S. Pat. No. 9,950,872, which claims priority to U.S. Provisional Application No. 62/261,304 filed Nov. 30, 2015. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND OF THE INVENTION

Field of the Invention

The present invention relates generally to a sweep auger and more specifically it relates to a bin sweep auger unplugging system for unplugging a central sump in a storage bin.

Description of the Related Art

Any discussion of the related art throughout the specification should in no way be considered as an admission that such related art is widely known or forms part of common general knowledge in the field.

Sweep augers have been in use for years to unload grain, granular material and other particulate material from storage bins. A conventional sweep auger is radially disposed and rotates about its longitudinal axis to draw the granular material to an unloading sump centrally positioned in an elevated floor of the storage bin. The sweep auger revolves around a central vertical axis to advance across the elevated floor of the bin in a sweeping action. The auger shaft typically is rotated by a drive assembly connected to the radial inner end of the shaft. A drive wheel is attached to the sweep auger to rotate the sweep auger around the floor of the storage bin. The drive wheel is sometimes attached to the radial outer end of the auger shaft for rotation therewith to support the outer portion of the auger as well as to assist in driving the auger in a sweeping motion in the storage bin. To unload the storage bin, the granular material (e.g. grain) is gravity fed through the unload sump in the floor of the storage bin and drawn through an unloading conveyor (e.g. auger conveyor) that is positioned below the floor. The granular material is drawn through the unloading conveyor to outside of the storage bin for loading onto a transport device such as a grain truck.

One problem encountered with conventional sweep augers is that the granular material above the opening of the unloading sump in the floor of the storage bin may clump together preventing the free flow of granular material through the unloading sump. Clumping may occur in various different ways and locations within the storage bin. For example, when the grain on the upper surface is moldy or frozen together the "grain bridge" eventually collapses with the clumps of grain being drawn downwardly to the unloading sump and blocking the entrance of the unloading sump. When clumping occurs above the unloading sump, the granular material is unable to be unloaded from the storage bin until the clump is broken up manually or the granular material is unloaded through an alternative unloading system which can significantly delay the unloading of the storage bin. The operator also can't rotate the sweep auger when the storage bin is full because rotating the sweep auger with the storage bin full (or having a significant volume of granular material) could damage the sweep auger or the drive system for the sweep auger.

BRIEF SUMMARY OF THE INVENTION

Provided herein is a sweep auger which includes an auger having a driven shaft with auger fighting, a drive unit having a drive shaft, and a clutch connected between the drive shaft and the driven shaft. The clutch selectively transfers the rotation of the drive shaft to the driven shaft of the auger. The drive shaft includes a clump breakup component that breaks up the clump of granular material above the unloading sump when the drive shaft is rotated. The clutch is disengaged when breaking up a clump of granular material to prevent the rotation of the auger.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3 is an upper perspective view of one embodiment of the bin sweep auger unplugging system.

FIG. 10 is a cross sectional view taken along line 10-10 of FIG. 7a.

DETAILED DESCRIPTION OF THE INVENTION

A. Overview

Figure 1:
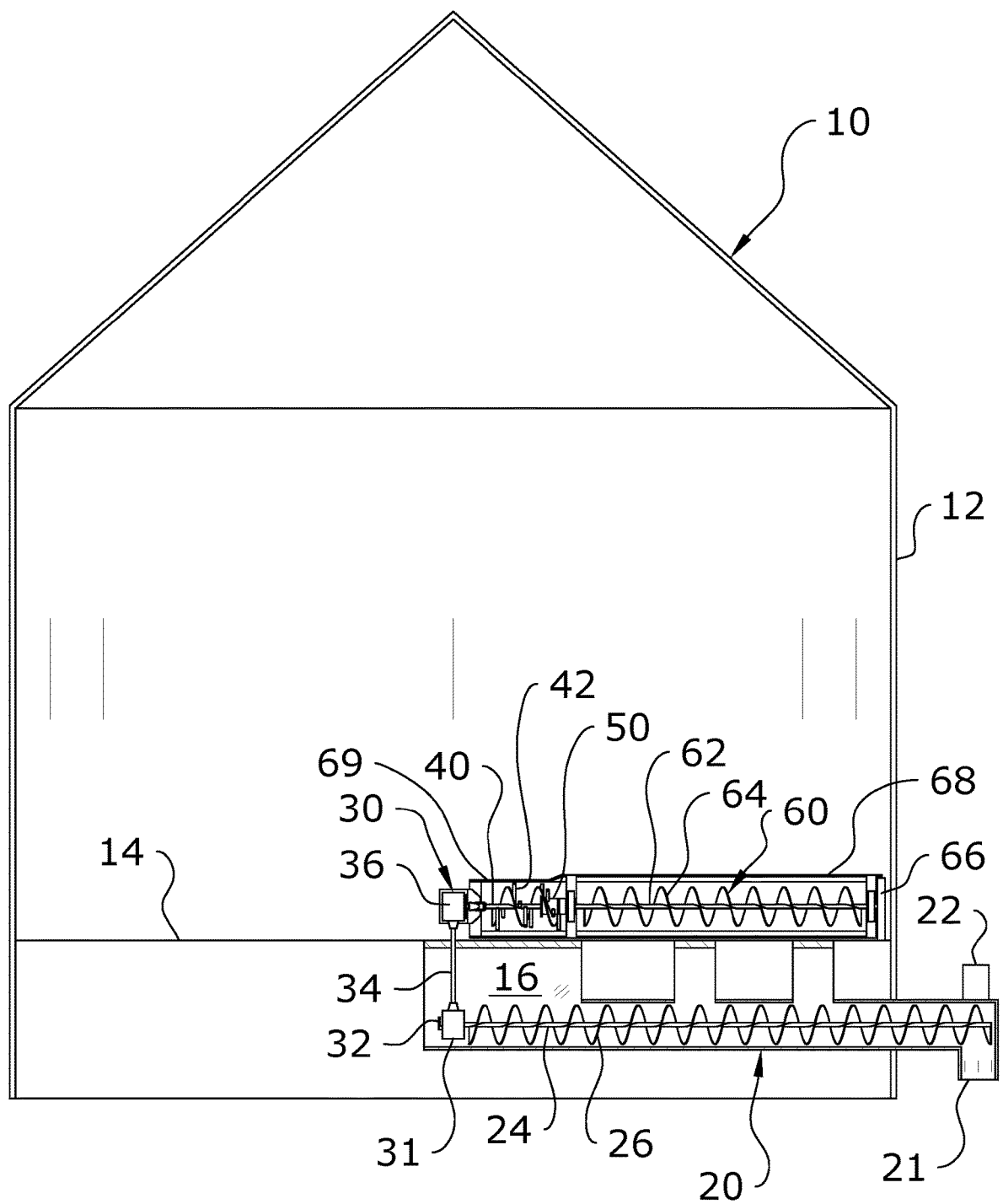
FIG. 1 is a side view of a bin sweep auger unplugging system within a storage bin.

Turning now descriptively to the drawings, in which similar reference characters denote similar elements throughout the several views, FIGS. 1 through 10 illustrate a bin sweep auger unplugging system, which comprises an auger 60 having a driven shaft 62 with auger fighting 64, a drive unit 30 having a drive shaft 40, and a clutch 50 connected between the drive shaft 40 and the driven shaft 62. The clutch 50 selectively transfers the rotation of the drive shaft 40 to the driven shaft 62 of the auger 60. The drive shaft 40 includes a clump breakup component 42 that breaks up the clump of granular material above the unloading sump 16 when the drive shaft 40 is rotated. The clutch 50 is disengaged when breaking up a clump of granular material to prevent the rotation of the auger 60. The drive shaft 40 and the driven shaft 62 may be tubular, solid or hybrid structures.

Figure 2:
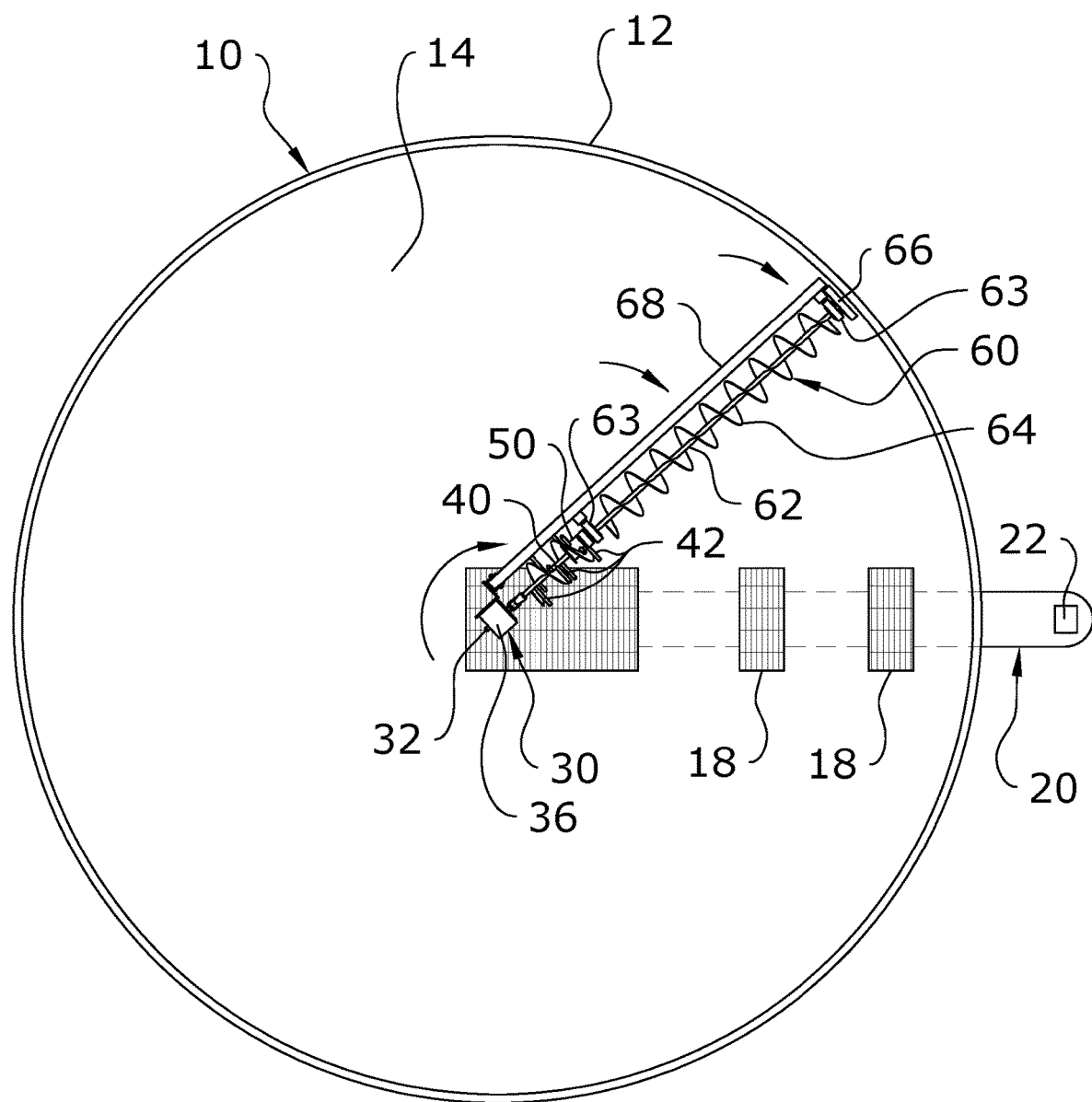
FIG. 2 is a top view of the bin sweep auger unplugging system within a storage bin.

The present invention may be utilized in various types of storage bins 10 such as, but not limited to, grain bins. The storage bins 10 may also have various shapes such as, but not limited to, circular storage bins 10. The storage bin 10 may receive, store and unload various types of granular materials such as, but not limited to, grain. The storage bins 10 also may have an elevated perforated floor 14 for drying the grain or other granular material. The storage bins 10 have at least one wall 12 (e.g. circular wall 12 as shown in FIG. 2) and a ceiling. The storage bins 10 are constructed of various types of materials such as metal.

B. Auger

The auger 60 has a driven shaft 62 with auger fighting 64 as illustrated in FIGS. 1 through 9b of the drawings. The auger 60 is positioned near or adjacent the upper surface of the floor 14 of the storage bin 10 as shown in FIG. 1 of the drawings. The auger 60 radially extends outwardly from a central vertical axis in the storage bin 10 (preferably the center axis of a circular storage bin 10) and rotates around the central vertical axis to clean the upper surface of the floor 14 of granular material such as grain.

The auger 60 is similar to a conventional sweep auger that is radially disposed in the storage bin 10 and rotates about its longitudinal axis to draw the granular material to an unloading sump 16 centrally positioned in an elevated floor 14 of the storage bin 10. The sweep auger 60 revolves around a central vertical axis to advance across the elevated floor 14 of the bin 10 in a sweeping action. A drive wheel 66 is attached to the auger 60 to rotate the auger 60 around the floor of the storage bin 10. The drive wheel 66 may be attached to the radial outer end of the driven shaft 62 for rotation therewith to support the outer portion of the auger 60 as well as to assist in driving the auger 60 in a sweeping motion in the storage bin 10.

Figure 5:
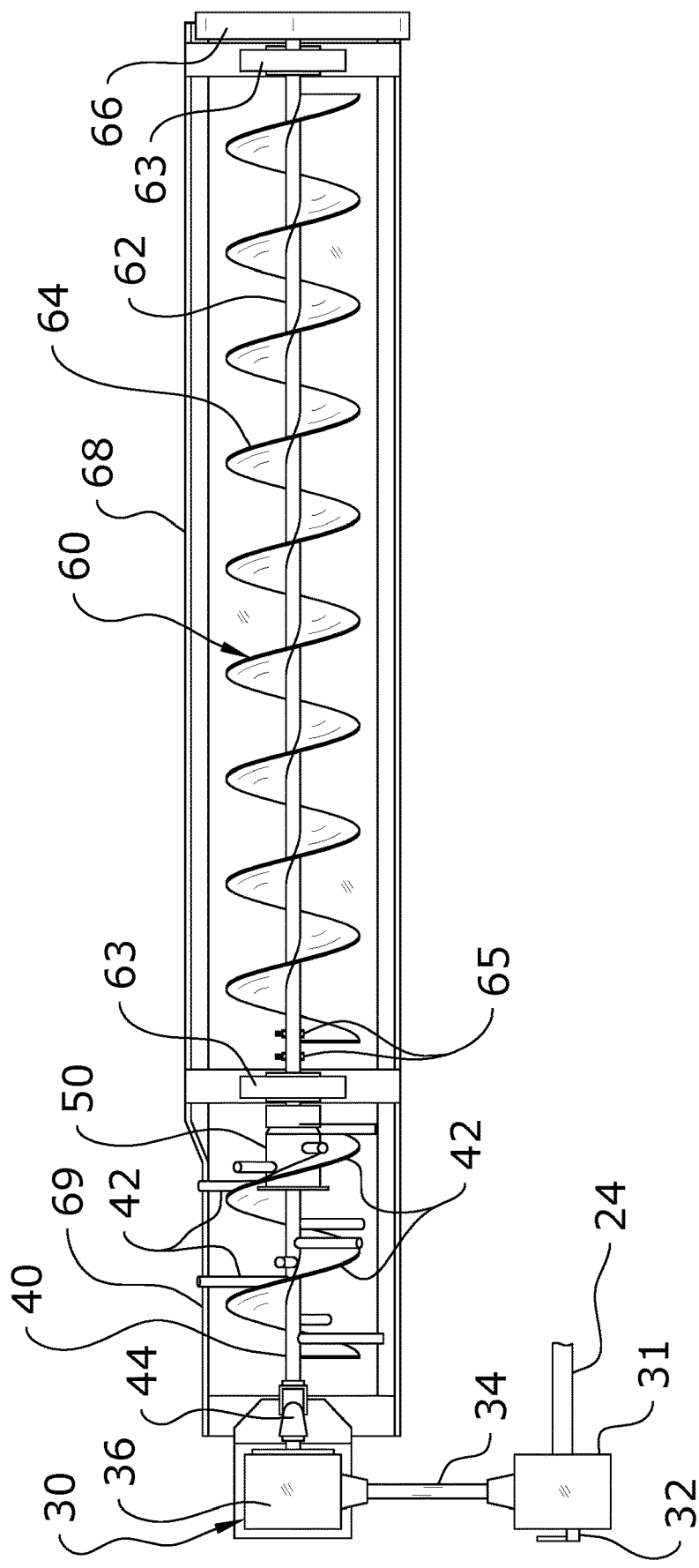
FIG. 5 is a front view of the bin sweep auger unplugging system.
Figure 6:
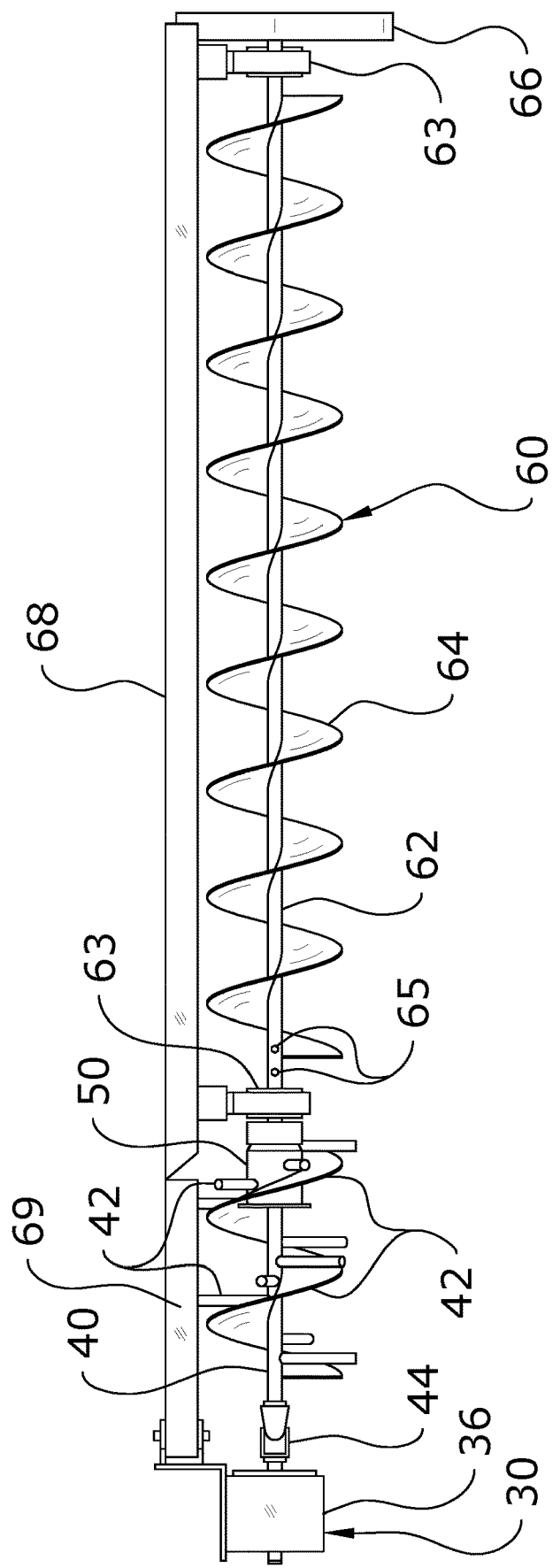
FIG. 6 is a top view of the bin sweep auger unplugging system.

The inner end of the auger 60 is rotatably supported by a support bearing 63 attached to the backboard 68, wherein the support bearing 63 rotatably supports the driven shaft 62 of the auger 60. The inner portion of the upper edge 69 of the backboard 68 is preferably below the height of at least some of the upper extending projections 42 to prevent a clump from resting on the backboard 68 above the upper ends of the projections 42. FIG. 5 provides an illustration where the radial elongated members 42 that extend upwardly from the drive shaft 40 extend above the upper edge 69 of the backboard 68. The remaining portion of the backboard extending from the inner portion to the outer end of the backboard 68 may have a height above auger fighting 64. The auger 60 is connected to the drive unit 30 by a clutch 50 which controls the engagement and disengagement of the auger 60 by the drive unit 30. The auger 60 further includes a drive wheel 66 connected to the driven shaft 62 at the distal end of the auger 60 that causes the auger 60 to rotate within the storage bin 10 upon the floor 14. U.S. Pat. No. 6,254,329 illustrates an exemplary sweep auger system and is hereby incorporated by reference herein.

C. Drive Unit

The drive unit 30 has a drive shaft 40 that is connected to the clutch 50. The drive shaft 40 may be a single rigid shaft or separated into multiple portions with a universal joint 44 positioned between the separate portions as illustrated in FIGS. 3 through 9b of the drawings.

The drive shaft 40 preferably includes one or more types of clump breakup projections 42 that extend outwardly from the drive shaft 40 to engage and breakup clumps of granular material. Examples of suitable projections 42 include, but are not limited to, fighting (having the same or different pitch and/or diameter as the auger fighting 64) and/or elongated members that extend outwardly from the drive shaft 40. Examples of suitable elongated members teeth, straight shafts (hollow or solid), curved shafts, paddles, pins, and/or tines extending outwardly (e.g. radially) from the drive shaft 40 as illustrated in FIGS. 1 through 9b of the drawings. While not required, the projections 42 are preferably constructed of a rigid material and structure such as metal.

Various combinations of one or more different types of projections 42 may be used. For example, fighting in combination with a plurality of shafts may be used as illustrated in FIGS. 3 through 9b of the drawings. To further this example, the shafts may be separate from the flighting (see FIG. 7a) or adjacent to the flighting (see FIGS. 3 through 4b). In addition, the shafts may be attached to the flighting or not attached to the fighting extending from the drive shaft 40. In addition, the shafts may extend outwardly beyond the radius/diameter of the flighting attached to the fighting as illustrated in FIGS. 5 through 9b of the drawings. The shafts may extend outwardly in a radial manner at various angles with respect to the longitudinal axis of the drive shaft 40. As another example, only fighting or only shafts may be used on the drive shaft 40. As another example, the fighting may have serrated edges or notches in the outer edge to better engage and breakup the clumps. As can be appreciated by one skilled in the art, the projections 42 may be comprised of any physical structure capable of effectively breaking up clumps of granular material such as frozen or moldy grain clumps. It is preferable that the projections 42 be comprised of the combination of a fighting to move the granular material and elongated members extending outwardly (and above the inner upper edge 69 of the backboard 68) as illustrated in FIGS. 1 through 10 of the drawings.

Various types and numbers of projections 42 that extend outwardly from the drive shaft 40 may be used to construct the clump breakup projection 42 such that the projection(s) 42 breaks up the clump(s) of granular material (e.g. frozen or moldy grain clump) that are near and/or above the opening of the unloading sump 16 thereby breaking apart the clumps when the drive shaft 40 is rotated. It should be noted that when in clump breakup mode, the drive shaft 40 rotates with the clutch 50 disengaged so that the auger 60 does not rotate with the drive shaft 40. After the grain is allowed to discharge via the unloading sump 16 sufficiently to allow for operation of the auger 60, then the clutch 50 is engaged thereby mechanically coupling the rotation of the drive shaft 40 with the driven shaft 62 of the auger 60.

FIGS. 1 through 8 illustrate the drive unit 30 as being comprised of a first gearbox 31 connected to the unloading shaft 24 of the unloading conveyor 20 and a second gearbox 36 connected to the first gearbox 31 by a connecting shaft 34. The first gearbox 31 and the second gearbox 36 may be comprised of 90 degree gearboxes as illustrated in the drawings. The second gear box 36 is above the floor 14 and the first gear box 31 is below the floor 14 of the storage bin 10 as best illustrated in FIG. 1 of the drawings. The second gearbox 36 rotates along with the position of the auger 60 positioned on the floor 14 as illustrated in FIG. 2.

A control member 32 (e.g. lever) is connected to the first gearbox 31 to control the rotational direction of the connecting shaft 34 extending upwardly from the first gearbox 31 thereby controlling the rotational direction of the drive shaft 40 connected to the first gearbox 31. The control member 32 may be activated remotely from outside of the storage bin 10 by a user manually (e.g. rod, cable) or an electric actuator (e.g. wireless remote control, wired remote control).

Alternatively, the drive unit 30 may be comprised of a motorized device such as a hydraulic motor 22 or an electric motor 22 that may allow for reversing of the rotational direction. If the drive unit 30 is comprised of a motorized device, then there is no need for gearboxes.

D. Unloading Conveyor

FIGS. 1 and 2 illustrate an example of an unloading conveyor 20 that is fluidly connected to the unloading sump 16 of the storage bin 10. The unloading conveyor 20 extends outside of the storage bin 10 and has a discharge opening 21 for discharging the granular material (e.g. grain) to a transport device such as a truck or trailer. A motor 22 is attached to the unloading conveyor 20 to drive the unloading conveyor 20. The unloading conveyor 20 may be comprised of any type of conveyor structure such as, but not limited to, a belt conveyor or auger type of conveyor. It is preferable that the unloading conveyor 20 is comprised of an auger conveyor having an unloading shaft 24 with unloading fighting 26 as illustrated in FIG. 1 of the drawings.

E. Clutch

The clutch 50 is connected between the drive shaft 40 and the driven shaft 62 to selectively transfer the rotation of the drive shaft 40 to the driven shaft 62 of the auger 60. The drive shaft 40 is connected to a first side of the clutch 50 and the driven shaft 62 is connected to the second side of the clutch 50.

The drive shaft 40 includes at least one clump breakup projection 42 that breaks up the clump of granular material above the unloading sump 16 when the drive shaft 40 is rotated. The clutch 50 may also include one or more projections 42 extending outwardly from the body of the clutch 50 to assist in moving granular material inwardly toward the unloading sump 16 and/or to breakup clumps of granular material.

The clutch 50 is disengaged when breaking up a clump of granular material to prevent the transfer of rotational power from the drive shaft 40 to the auger 60. The clutch 50 may be comprised of various types of devices capable of engaging and disengaging the rotational motion of the drive shaft 40 to the driven shaft 62 of the auger 60. The clutch 50 is preferably concentrically positioned with respect to the longitudinal axis of the drive shaft 40 and the driven shaft 62. Furthermore, one or more projections 42 may extend outwardly from the clutch 50.

Figure 4A:
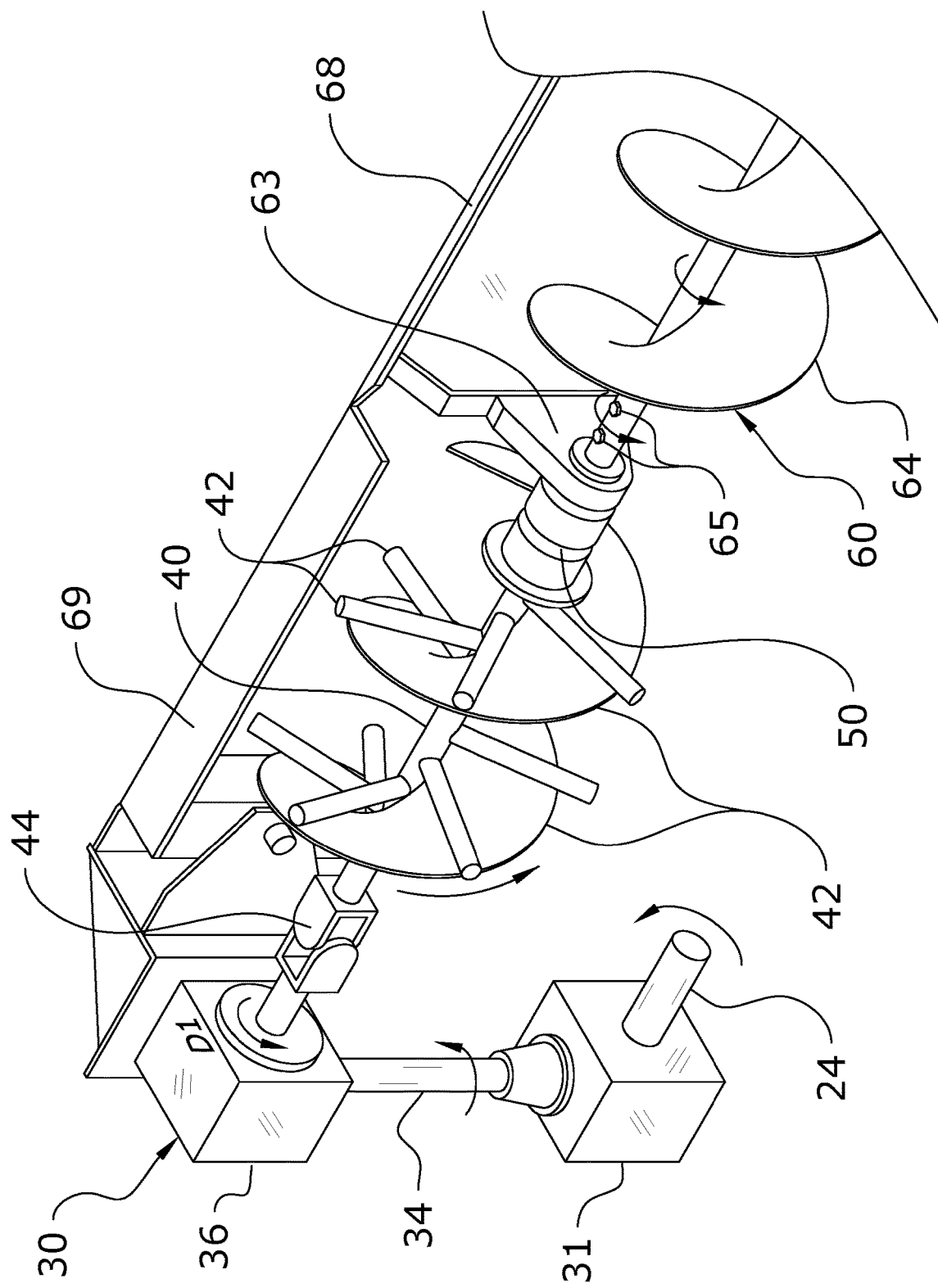
FIG. 4a is a magnified upper perspective view of FIG. 3 with the drive shaft rotating in a first direction with the clutch engaging the driven shaft thereby rotating the auger in the same direction to move the granular material inwardly toward the unloading sump.
Figure 4B:
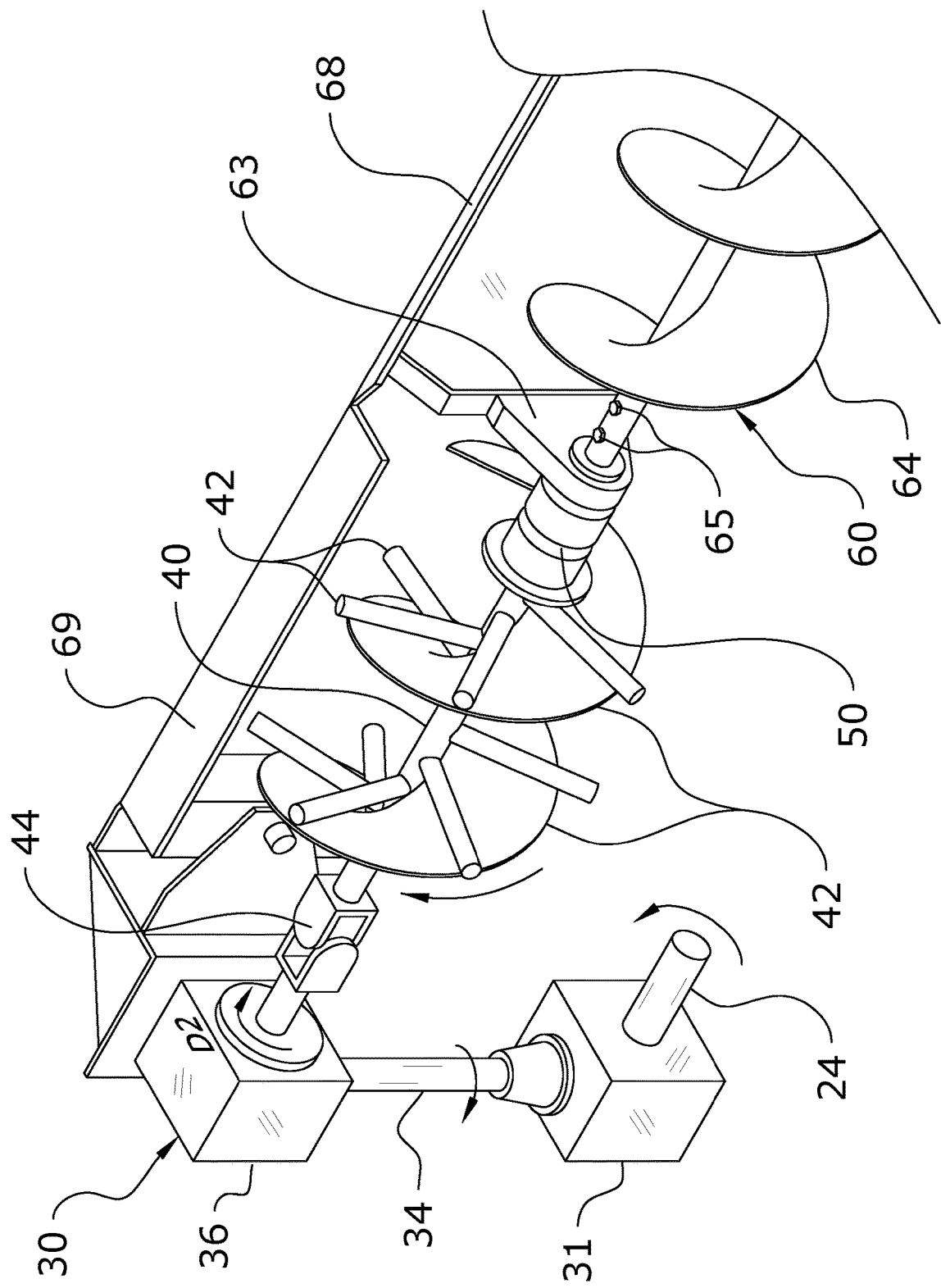
FIG. 4b is a magnified upper perspective view of FIG. 3 with the drive shaft rotating in a second direction with the clutch disengaging thereby not rotating the auger while allowing the drive shaft to freely rotate to dislodge any clumping near the unloading sump.

For example, the clutch 50 may be comprised of a one-way clutch such as an overrunning clutch (a.k.a. one-way freewheel clutch) which engages the driven shaft 62 of the auger 60 when rotated by the drive shaft 40 in a first rotational direction (see FIG. 4a for an example) and that disengages the driven shaft 62 of the auger 60 when rotated by the drive shaft 40 in a second rotation direction that is opposite of the first rotational direction (see FIG. 4b for an example). The overrunning clutch may be comprised of a sprag overrunning clutch or a ramp and roller overrunning clutch. The clutch 50 engages when the drive shaft 40 rotates in a first direction thereby rotating the entire auger 60 and disengages (i.e. freewheels) when the drive shaft 40 rotates in a second direction that is opposite of the first direction thereby freely rotating with respect to the driven shaft 62 of the auger 60.

Figure 9A:
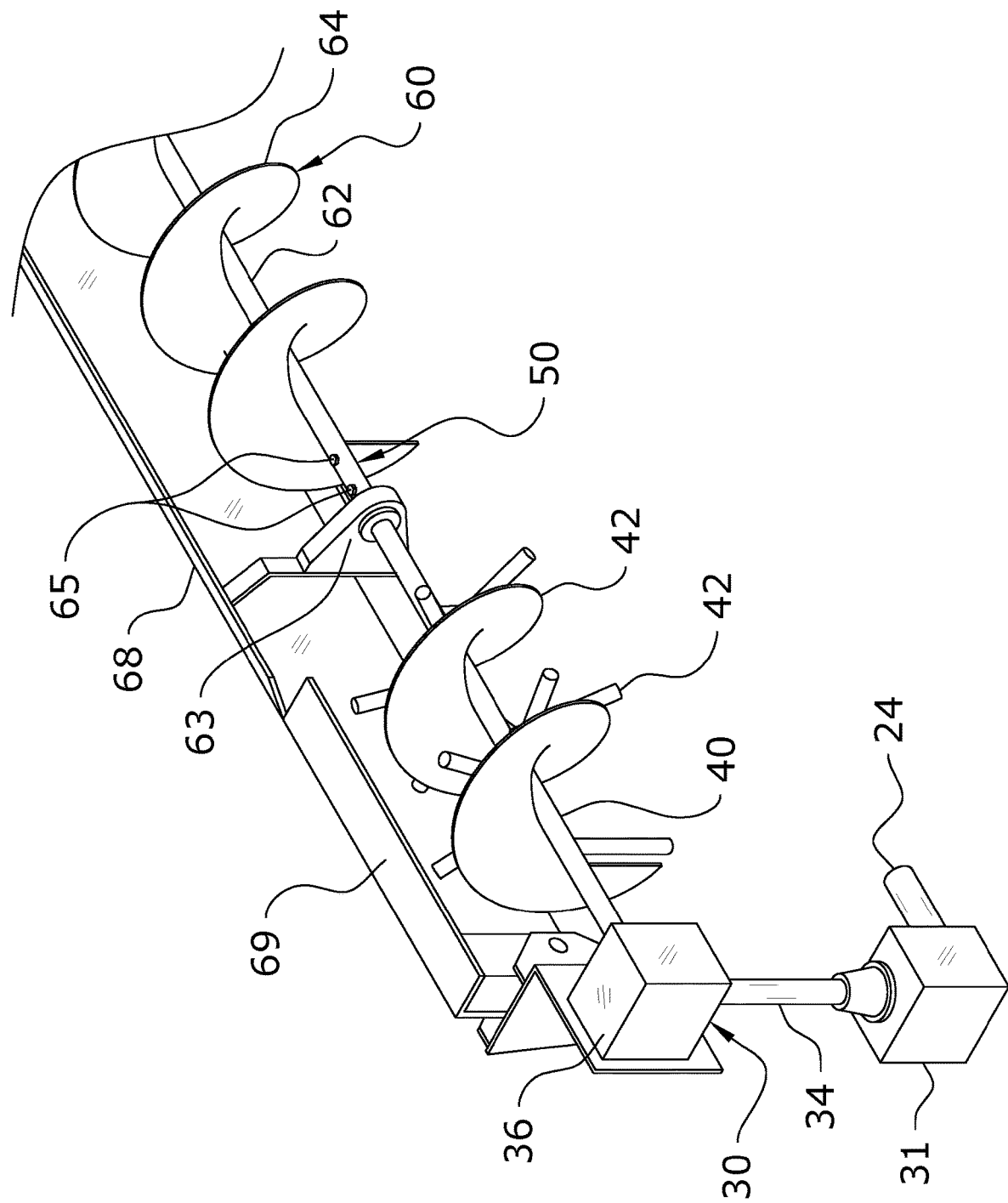
FIG. 9a is a magnified upper perspective view of the first alternative embodiment of the bin sweep auger unplugging system.
Figure 9B:
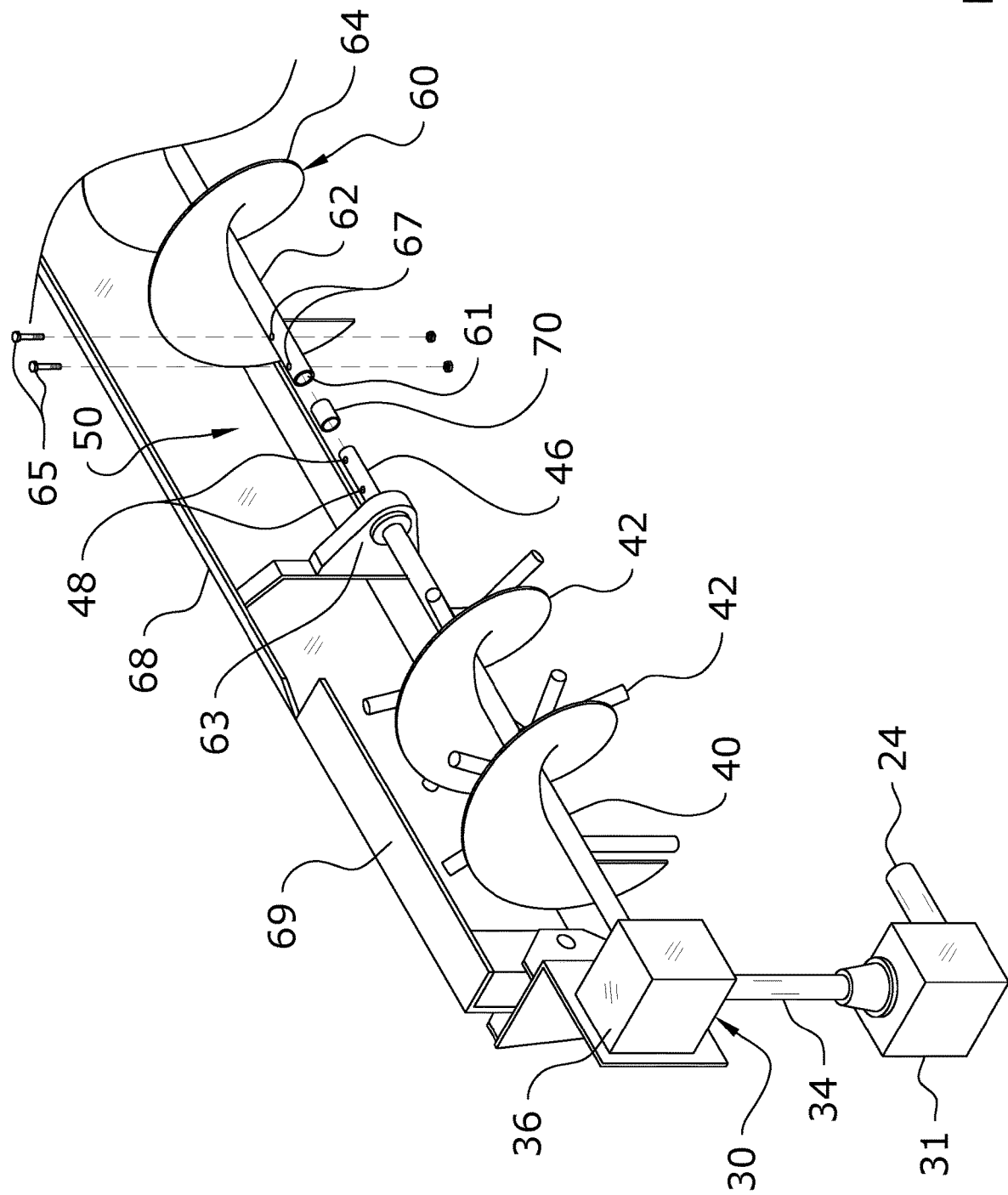
FIG. 9b is an exploded magnified upper perspective view of the first alternative embodiment of the bin sweep auger unplugging system.
Figure 10:
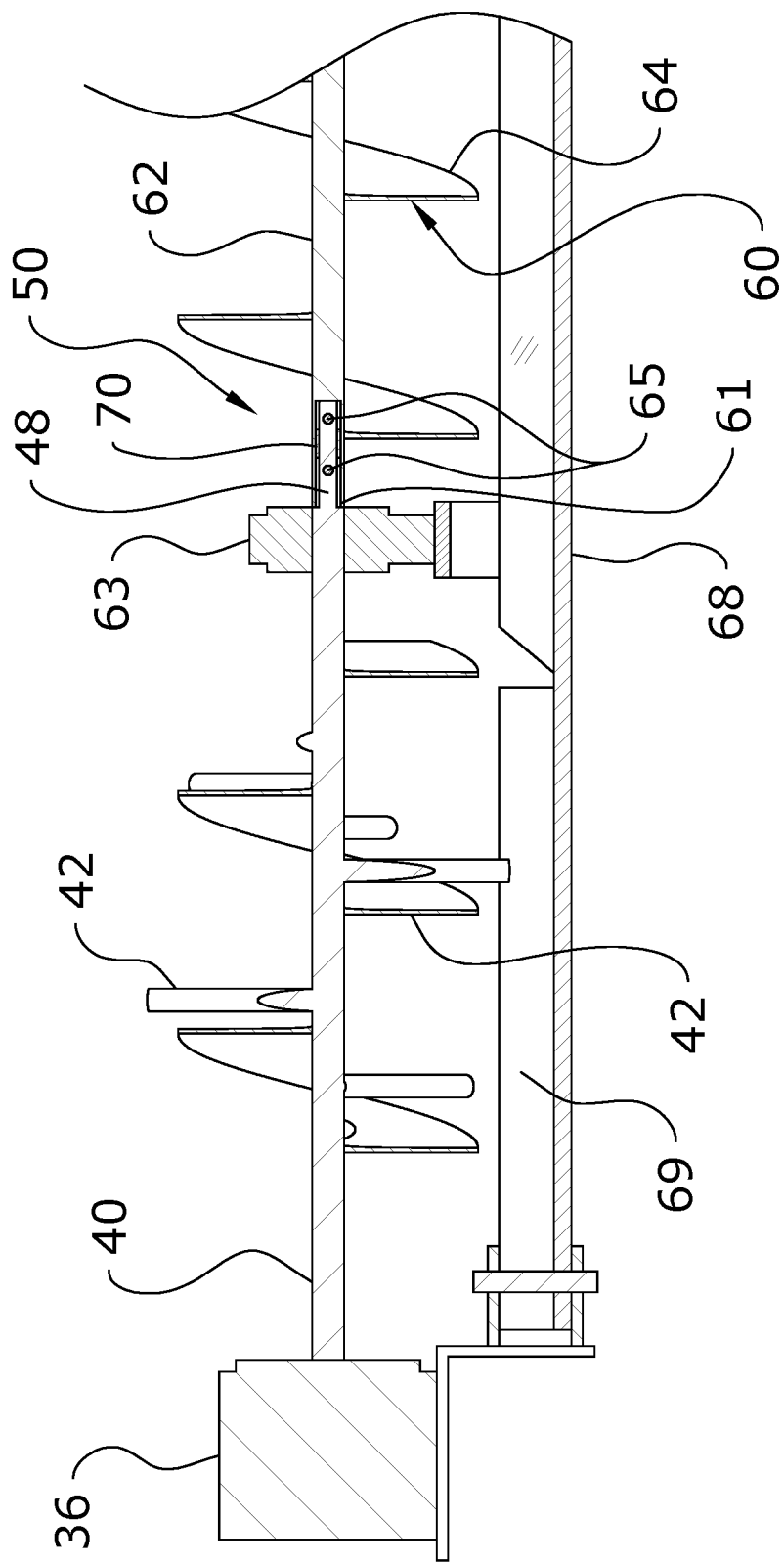

FIGS. 7a through 9b illustrate an alternative embodiment of the clutch 50 comprised of fasteners (e.g. bolts) that are manually removed from between the drive shaft 40 and the driven shaft 62 thereby disconnecting the two shafts from one another when the storage bin 10 is filled with grain. As shown in FIGS. 7a through 9b, the drive shaft 40 includes a distal portion 46 that includes at least one aperture 48 and an end opening 61 within the inner end of the driven shaft 62 that rotatably receives the distal portion 46 of the drive shaft 40. Alternatively, it can be appreciated that the end opening 61 may extend into the distal end of the drive shaft 40 to rotatably receive the inner end of the driven shaft 62. A bushing 70 may be positioned within the lumen of the end opening 61 of the driven shaft 62 as shown in FIG. 9b of the drawings. The distal portion 46 of the drive shaft 40 includes at least one aperture 48 and the inner portion of the driven shaft 62 includes at least one aperture 67 that corresponds to the apertures 48 of the drive shaft 40 so that one or more fasteners 65 may be inserted (or removed) through the apertures 48, 67 to engage the manual clutch 50 by locking the drive shaft 40 with the driven shaft 62. When the fasteners 65 are removed from the apertures 48, 67, the drive shaft 40 is able to rotate freely from the driven shaft 62 thereby not rotating the auger 60. The figures illustrate the apertures 48, 67 and corresponding fasteners 65 as having aligned longitudinal axis, however, it can be appreciated that having the apertures 48, 67 aligned approximately 90 degrees with respect to one another so the apertures 48, 67 are transverse to one another can be used to evenly transfer the forces encountered.

Figure 7A:
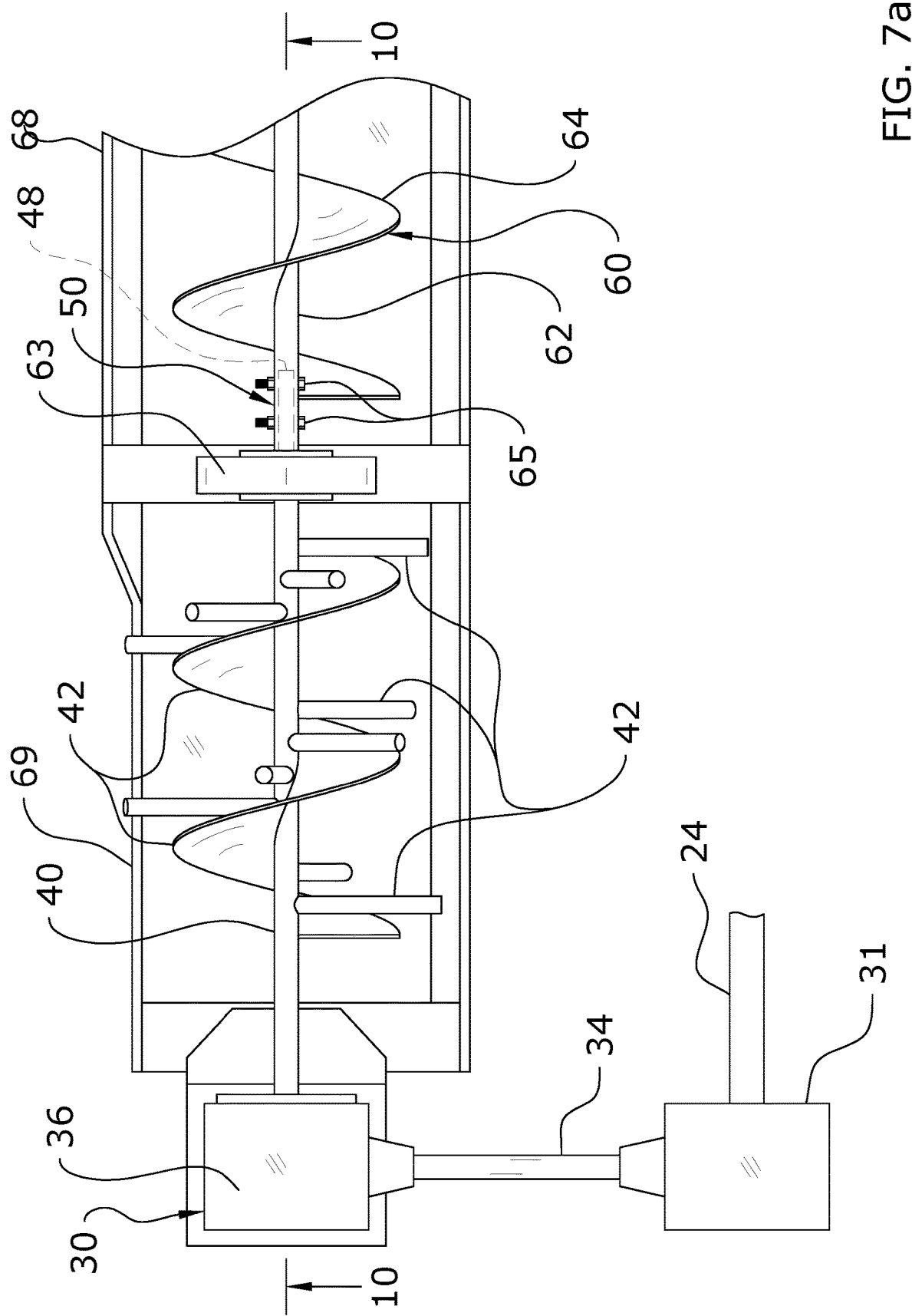
FIG. 7a is a front view of a first alternative embodiment of the bin sweep auger unplugging system with the clutch engaged.
Figure 7B:
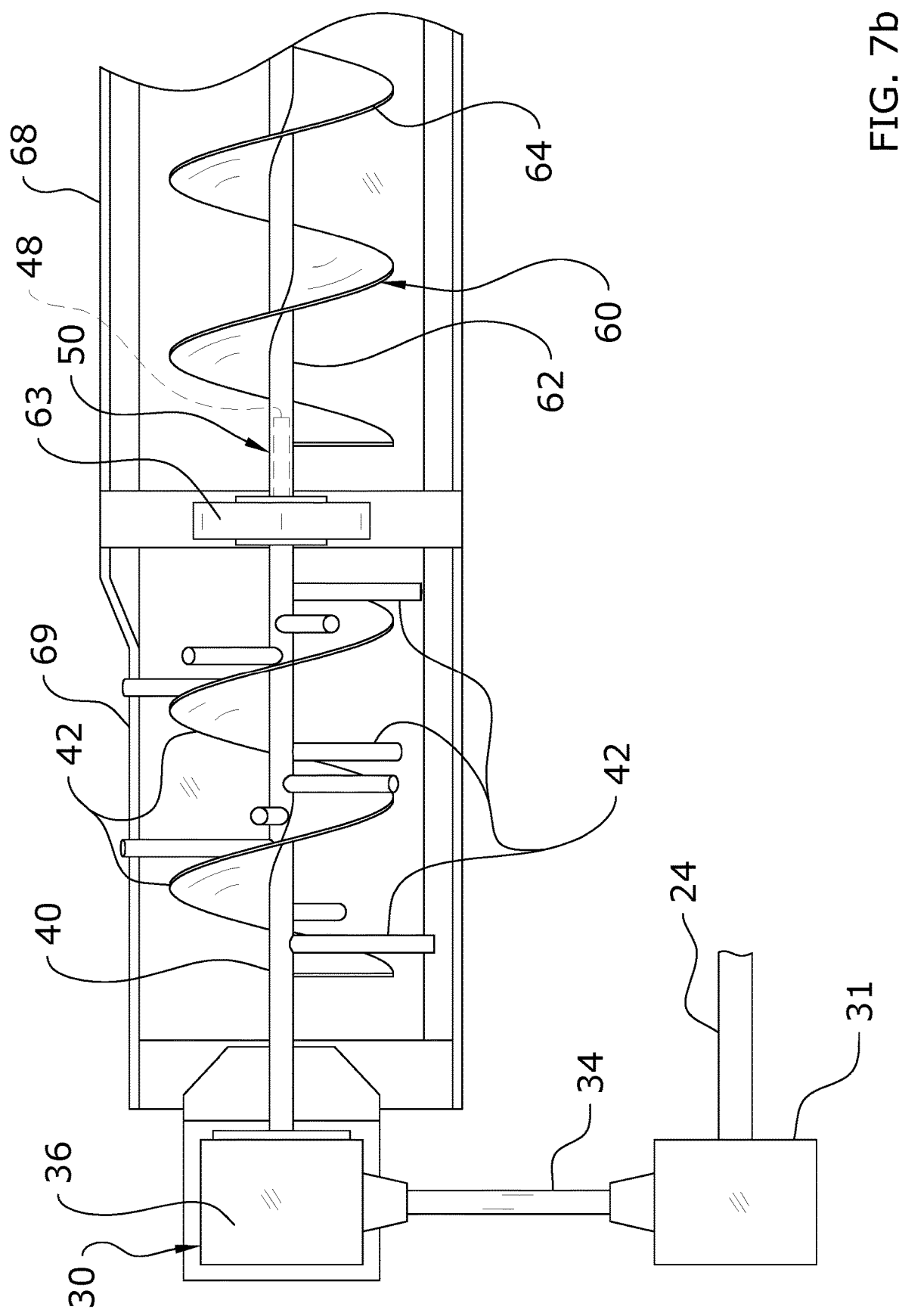
FIG. 7b is a front view of the first alternative embodiment of the bin sweep auger unplugging system with the fasteners removed to disengage the clutch.
Figure 8:
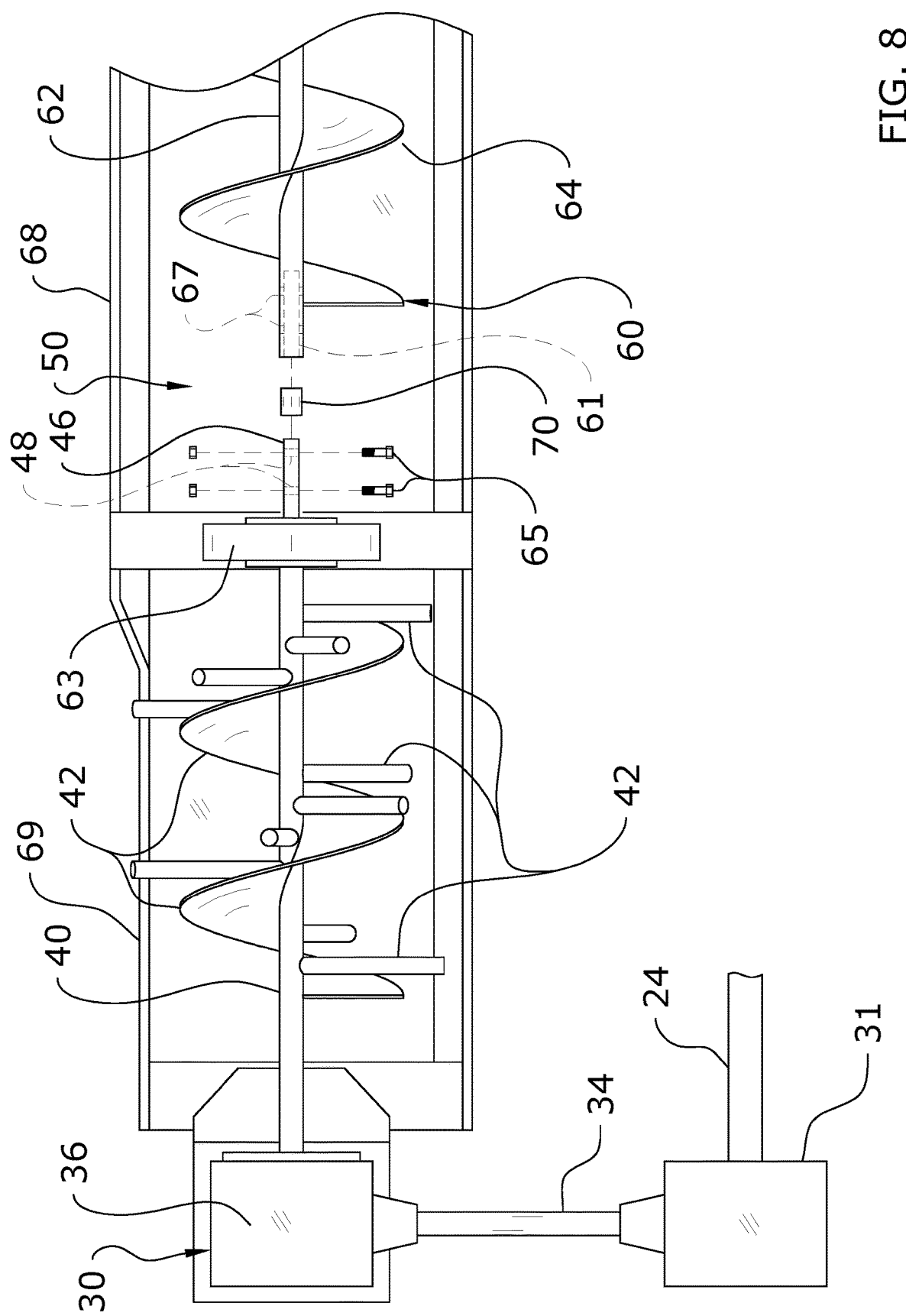
FIG. 8 is an exploded front view of the first alternative embodiment of the bin sweep auger unplugging system.

The alternative embodiment shown in FIGS. 7a through 10 allows the drive shaft 40 to rotate freely with respect to the driven shaft 62 after the storage bin 10 is filled with grain to allow for unclogging the unloading sump 16 as illustrated in FIG. 7b. After the grain level in the storage bin 10 has lowered to a sufficient level to expose the clutch 50, the user then inserts the fasteners 65 to mechanically connect to the drive shaft 40 to the driven shaft 62 of the auger 60 to prevent rotation of the two shafts with respect to one another and thereby allowing the drive shaft 40 to rotatably drive the driven shaft 62 of the auger 60 to sweep the grain into the unloading sump 16 and any auxiliary sumps 18 as shown in FIGS. 7a and 9a.

The clutch 50 may be remote controlled and/or mechanically actuated by an actuator (e.g. hydraulic actuator, electric actuator and the like). For example, the clutch may be comprised of a friction clutch that is manipulated by an actuator. Various other types of clutches 50 may be utilized with the present invention that are capable of engaging and disengaging to selectively lock or unlock the rotation of the drive shaft 40 with the driven shaft 62 of the auger 60.

F. Operation

The following discussion relates to grain and grain bins, but it can be appreciated the sweep auger unplugging system may be used with various other types of granular material and storage bins 10. Furthermore, the example provided below relates to the one-way clutch embodiment and should not be considered limiting the scope of the function or types of clutches the invention is comprised of (see above discussion relating to the operation of other types of clutches).

In use, the sweep auger unplugging system may be used as any conventional type of sweep auger. FIGS. 1 and 2 illustrate the sweep auger unplugging system positioned within a storage bin 10 such as a circular grain bin 10. The sweep auger 60 draws the grain inwardly toward the central portion of the storage bin 10 to pass through the unloading sump 16 wherein the grain is then gravity fed downwardly to the unloading conveyor 20 which removes the grain from the storage bin 10 to the outside of the storage bin 10 for removal and transport.

In a situation where the storage bin 10 is completely full or partially full with grain, the grain may form clumps because of various reasons such as freezing or mold. The grain clumps are eventually drawn downwardly towards the unloading sump 16 where the grain clumps block the free flow of grain into the unloading sump 16 thereby preventing the unloading of the grain from the storage bin 10. When the operator determines that a grain clump exists that is blocking the unloading sump 16, the operator may manipulate the lever 32 from outside of the storage bin 10 (e.g. with an elongated rod, cable, wireless remote control that controls an actuator or other device connected to the lever 32) into an "unplug position" which reverses the rotation of the drive shaft 40 to a second direction as shown in FIG. 4b. Once the lever 32 is moved to the unplug position, the operator then activates the motor 22 which drives the unloading conveyor 20 in a first direction which then rotates the connecting shaft 34 in a second direction (by the first gearbox 31) which then rotates the drive shaft 40 in a second direction (by the second gearbox 36) as shown in FIG. 4b. When the drive shaft 40 rotates in the second direction, the one-way clutch 50 disengages and does not rotate the driven shaft 62 of the auger 60 thereby allowing the drive shaft 40 along with the projections 42 to rotate to break up the grain clump that is plugging the unloading sump 16. Once the operator determines that grain is again freely flowing from the unloading conveyor 20 the operator manipulates the lever 32 into a "neutral position" so that the connecting shaft 34 is not rotated thereby allowing for the unloading of the grain without rotating the drive shaft 40. After the level of grain falls to a level suitable for operation of the auger 60, the operator manipulates the position of the lever 32 into a "unload position". Once the lever 32 is moved to the unload position, the operator then activates the motor 22 which drives the unloading conveyor 20 in the first direction which then rotates the connecting shaft 34 in a first direction (by the first gearbox 31) which then rotates the drive shaft 40 in a first direction (by the second gearbox 36) as shown in FIG. 4a. With the drive shaft 40 rotating in the first direction, the clutch 50 engages the driven shaft 62 to rotate the auger 60 to move the grain inwardly toward the unloading sump 16 in the central portion of the storage bin 10 for unloading similar to a conventional sweep auger. As the auger 60 rotates, the drive wheel 66 moves the distal end of the auger 60 about a central vertical axis of the storage bin 10 to clean the floor 14 of the storage bin 10 as shown in FIGS. 1 and 2 of the drawings.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A bin sweep auger, comprising:
   a backboard;
   a drive shaft having an inner end and an outer end;
   a first flighting extending from the drive shaft;
   a drive unit connected to the inner end of the drive shaft, wherein the drive unit is configured to selectively rotate the drive shaft in a first direction or a second direction, wherein the first direction is opposite of the second direction;
   a driven shaft having an inner end and an outer end, wherein the driven shaft is rotatably connected to the backboard;
   a second flighting extending from the driven shaft; and
   a clutch connected between the drive shaft and the driven shaft;
   wherein the clutch is configured for engaging or disengaging to selectively lock or unlock the rotation of the drive shaft with the driven shaft;
   wherein the clutch is engaged when the drive shaft is rotated in the first direction so that the drive shaft rotates the driven shaft in the first direction, and wherein the clutch is disengaged when the drive shaft is rotated in a second direction so that the drive shaft does not rotate the driven shaft in the second direction;

wherein the first flighting and the second flighting are adapted to unload grain from a grain bin when rotated in the first direction;

wherein the first fighting is adapted to break up a grain clump when rotated in the second direction.

2. The bin sweep auger of claim 1, wherein the first fighting and the second fighting have the same flighting direction.

3. The bin sweep auger of claim 1, wherein the first fighting and the second fighting have the same pitch.

4. The bin sweep auger of claim 1, wherein the first fighting and the second fighting have the same diameter.

5. The bin sweep auger of claim 1, a plurality of projections extending from the drive shaft, wherein the projections are adapted for breaking up clumps of granular material.

6. The bin sweep auger of claim 5, wherein the projections are each comprised of an elongated member extending outwardly from the drive shaft.

7. The bin sweep auger of claim 6, wherein the projections each extend outwardly and radially from the drive shaft.

8. The bin sweep auger of claim 6, wherein the projections are each comprised of teeth, tines or straight shafts.

9. The bin sweep auger of claim 1, wherein the clutch is comprised of a one-way clutch.

10. The bin sweep auger of claim 1, wherein the clutch is concentrically positioned with respect to the drive shaft and the driven shaft.

11. The bin sweep auger of claim 1, wherein the clutch is comprised of a manual clutch.

12. The bin sweep auger of claim 1, wherein the clutch is comprised of the outer end of the drive shaft being rotatably connected to the inner end of the driven shaft and a fastener removably extending through an aperture within the drive shaft and the driven shaft.

13. The bin sweep auger of claim 1, wherein the clutch is remote controlled to selectively engage or disengage.

14. The bin sweep auger of claim 1, wherein the clutch is mechanically actuated by an actuator to selectively engage or disengage.

15. The bin sweep auger of claim 1, wherein the drive unit is comprised of a reversible motor that rotates the drive shaft in the first direction or the second direction.

16. The bin sweep auger of claim 1, wherein the drive unit is comprised of a motor connected to at least one gearbox that rotates the drive shaft in the first direction or the second direction.

17. The bin sweep auger of claim 16, wherein the at least one gearbox is comprised of a first gearbox connected to an unloading conveyor and a second gearbox connected to the first gearbox by a connecting shaft, wherein the drive shaft extends from the second gearbox.

18. The bin sweep auger of claim 17, including a control member connected to the first gearbox, wherein the control member controls the rotational direction of the connecting shaft.

19. The bin sweep auger of claim 1, wherein the drive shaft is positioned above an unloading sump in a storage bin.

20. A method of using the bin sweep auger of claim 1, comprising the step of rotating the drive shaft in the second direction by the drive unit with the clutch disengaged to break up a grain clump by the rotation of the drive shaft and the first fighting in the second direction without rotating the driven shaft.

* * * * *

UNITED STATES PATENT AND TRADEMARK OFFICE
CERTIFICATE OF CORRECTION

PATENT NO. : 10,752,447 B1
APPLICATION NO. : 16/871552
DATED : August 25, 2020
INVENTOR(S) : Claire M. Rauser and Jory T. Skalsky It is certified that error appears in the above-identified patent and that said Letters Patent is hereby corrected as shown below:

On the Title Page
Item (57) Abstract Line 4, "auger fighting" should read --auger flighting--

In the Specification
Column 2, Line 14, "auger fighting" should read --auger flighting--
Column 3, Line 29, "auger fighting 64" should read --auger flighting 64--
Column 3, Line 55, "auger fighting 64" should read --auger flighting 64--
Column 4, Line 22, "auger fighting 64" should read --auger flighting 64--
Column 4, Line 43, "fighting" should read --flighting--
Column 4, Line 44, "auger fighting 64" should read --auger flighting 64--
Column 4, Line 54, "fighting" should read --flighting--
Column 4, Line 60, "fighting" should read --flighting--
Column 4, Line 62, "fighting" should read --flighting--
Column 4, Line 66, "fighting" should read --flighting--
Column 4, Line 67, "fighting" should read --flighting--
Column 5, Line 7, "fighting" should read --flighting--
Column 5, Line 61, "fighting" should read --flighting--

In the Claims
Claim 1, Column 9, Line 4, "the first fighting" should read --the first flighting--
Claim 2, Column 9, Line 7, "fighting and the second fighting" should read --flighting and the second flighting--
Claim 3, Column 9, Line 10, "fighting and the second fighting" should read --flighting and the second flighting--
Claim 4, Column 9, Line 12, "fighting and the second fighting" should read --flighting and the second flighting--
Claim 20, Column 10, Line 30, "the first fighting" should read --the first flighting--

Signed and Sealed this
Second Day of March, 2021

Drew Hirshfeld
*Performing the Functions and Duties of the
Under Secretary of Commerce for Intellectual Property and
Director of the United States Patent and Trademark Office*